US008703258B1

(12) United States Patent
Shamberger

(10) Patent No.: US 8,703,258 B1
(45) Date of Patent: Apr. 22, 2014

(54) NUCLEATING AGENT FOR LITHIUM NITRATE TRIHYDRATE THERMAL ENERGY STORAGE MEDIUM

(75) Inventor: Patrick Shamberger, Centerville, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 13/361,028

(22) Filed: Jan. 30, 2012

(51) Int. Cl.
*C09K 5/00* (2006.01)
*B32B 1/00* (2006.01)

(52) U.S. Cl.
USPC .......................... 428/34.1; 252/71

(58) Field of Classification Search
USPC .......................... 428/34.1; 252/71
See application file for complete search history.

(56) References Cited

U.S. PATENT DOCUMENTS

| | | | | |
|---|---|---|---|---|
| 3,720,198 | A * | 3/1973 | Laing et al. ............... | 126/400 |
| 3,877,642 | A | 4/1975 | Vonnegut | |
| 4,332,690 | A | 6/1982 | Kimura et al. | |
| 4,503,838 | A | 3/1985 | Arrhenius et al. | |
| 6,227,285 | B1 * | 5/2001 | Hildebrand et al. ........... | 165/10 |
| 7,135,424 | B2 * | 11/2006 | Worley et al. ................. | 442/131 |
| 7,582,202 | B2 | 9/2009 | Jones et al. | |
| 2005/0167633 | A1 | 8/2005 | Glausch et al. | |
| 2005/0247906 | A1 | 11/2005 | Neuschutz et al. | |

FOREIGN PATENT DOCUMENTS

DE          102 18 977     * 11/2003  ............... C09K 5/02

OTHER PUBLICATIONS

Machine translation of DE 102 18 977 (Nov. 2003).*
http://www.siliconespectator.com/articles/Silicone_Spectator_March_2009.pdf (Mar. 2009 originally published May 2000).*
http://www.dtic.mil/cgi-bin/GetTRDoc?AD=ADA554158 (Dec. 2011).*
Kersti, Hermansson et al, Deformation Electron Density of Lithium Nitrate Trihydrate, Acta Cryst (1984), pp. 335-340.
B. Vonnegut and Henry Chessin, Ice Nucleation by Coprecipited Silver Iodide and Silver bromide, Science, 1971 vol. 174, pp. 945-946.
C.H. Yoder, E. Bushong, W.Liu, V. Weidner, P. McWilliams, K Martin, J. Lorgunpai, J. Haller, R.W. Schaeffer, The Synthesis and solubility of the copper hydroxyl nitrates: gerhardtite, rouaite and likasite, Mineralogical Magazine, 2010, pp. 433-440.
L.F. Mondolfo, B. Vonnegut, Henry Chessin, Nucleation and Lattice Disregistry, Science, 1972, p. 695.
H. Effenberger, Wien, Likasite, Cu3(OH)5(NO3)*2(H20): Revision of the chemical formulas and redetermination of the crystal structure, Neues Jahrb. Mineral., Monatsh, 1986, pp. 101-110.
M. J. Hoover et al., "Space Thermal Control Development," NASA Technical Report 19720007297 in NASA-CR-150724 (1972) 81 pages total.

* cited by examiner

*Primary Examiner* — Erik Kashnikow
(74) *Attorney, Agent, or Firm* — AFMCLO/JAZ; Chastity Whitaker

(57) ABSTRACT

The present invention describes a nucleating agent tailored specifically to the thermal energy storage medium lithium nitrate trihydrate (LiNO$_3$-3H$_2$O), and to the use thereof. Addition of the nucleating agent copper hydroxy nitrate hydrate [Cu$_3$(OH)$_5$(NO$_3$)-2H$_2$O](Likasite) suppresses the undercooling in lithium nitrate trihydrate, forming a superior composite thermal energy storage medium.

5 Claims, 4 Drawing Sheets

NUCLEATING AGENT FOR LITHIUM NITRATE TRIHYDRATE THERMAL ENERGY STORAGE MEDIUM

RIGHTS OF THE GOVERNMENT

The invention described herein may be manufactured and used by or for the Government of the United States for all governmental purposes without the payment of any royalty.

BACKGROUND OF THE INVENTION

This invention relates to a heat storage material that reversibly absorbs or releases heat through liquid/solid phase changes. Specifically, the invention relates to a material composed of lithium nitrate trihydrate ($LiNO_3.3H_2O$), or some non-stoichiometric mixture of $LiNO_3$ and $H_2O$, and containing additives to decrease the undercooling of the liquid phase.

Lithium nitrate trihydrate is of great practical interest as a heat storage material due to its large specific heat of fusion (287 J/g; 452 $MJ/m^3_{solid}$; 409 $MJ/m^3_{liquid}$), which is even larger than that of water on a volumetric basis (FIG. 1). This large volumetric energy density is useful for small form factor thermal energy storage modules, where space is a limiting factor. Furthermore, the melting temperature ($T_m$) of lithium nitrate trihydrate (30.1° C.) is appropriate for a wide variety of near-room temperature applications (e.g., electronics, avionics, transportation, aerospace, etc.). Therefore, lithium nitrate trihydrate is a desirable material to store thermal energy and regulate temperature.

It is commonly known that many salt hydrates do not spontaneously crystallize at the same temperature at which they melt (FIG. 2). This temperature difference is referred to as undercooling ($\Delta T$), and it is caused by the energy barrier that must be overcome to form a crystalline nucleus large enough that it will continue to grow spontaneously (homogeneous nucleation). Undercooling degrades the performance of a thermal energy storage (TES) component by: 1) decreasing the temperature at which heat can be released and 2) decreasing the exergetic efficiency of the thermal energy storage module. Furthermore, crystallization occurs at inconsistent temperatures, and after an uncertain period of time, as homogeneous nucleation is a stochastic process, leads to unpredictable behavior of TES components. Finally, when nucleation does occur, crystallization proceeds in rapid, uncontrollable fashion, which can lead to damage of TES components.

Nucleation agents are additives having a different solid phase as compared to the TES component that promote heterogeneous nucleation (nucleation of the desired phase along the solid-liquid interface) thereby decreasing undercooling (FIG. 2, FIG. 3). Such additives have been previously demonstrated in a number of systems, most notably in the water-ice system (Vonnegut, B. and Chessin, H., Science, 1971, 174, 954-946.; U.S. Pat. No. 3,877,642). In these cases, it has been pointed out that crystal lattice similarities between the nucleation agent and the solid nucleant phase and surface energy considerations are instrumental in finding an effective nucleation catalyst (Mondalfo. L. F., Science, 1972, 176, 695.).

Previous research has identified potential nucleation agents for lithium nitrate trihydrate, including zinc hydroxy nitrate, $Zn_3(NO_3)_2(OH)_4$ (Hoover, M. J. et al., NASA Technical Report 19720007297, NASA-CR-150724, 1972; U.S. Pat. Pub. 2005/0167633). However, these nucleation agents have the disadvantage of allowing for a large degree of undercooling or having questionable stability over large numbers of cycles.

SUMMARY OF THE INVENTION

The present invention describes a nucleating agent tailored specifically to a lithium nitrate trihydrate ($LiNO_3.H_2O$) thermal energy storage medium, and to the use thereof. Lithium nitrate trihydrate is a technologically useful thermal storage material due to its high volumetric storage density. This property allows for small for a factor thermal storage components, allows for rapid absorption of heat, and saves on system weight and cost, which are due to reduced requirements for balance of system components (e.g. heat exchangers). However, pure lithium nitrate trihydrate is not technologically useful because a large undercooling observed. Applicants have discovered that addition of a copper hydroxy nitrate hydrate $[Cu_3(OH)_5(NO_3).2H_2O]$ (Likasite) nucleating agent suppresses the undercooling in lithium nitrate trihydrate, forming a superior composite thermal energy storage medium.

DETAILED DESCRIPTION OF THE INVENTION

Figure 1:
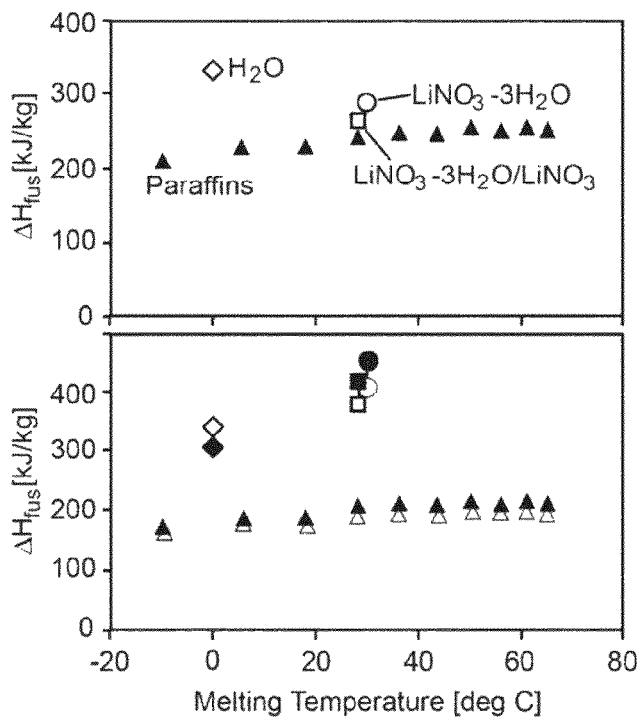
FIG. 1 illustrates the specific energy storage density and volumetric energy storage density of lithium nitrate trihydrate relative to water and to the even paraffins (other common phase change materials).
Figure 2:
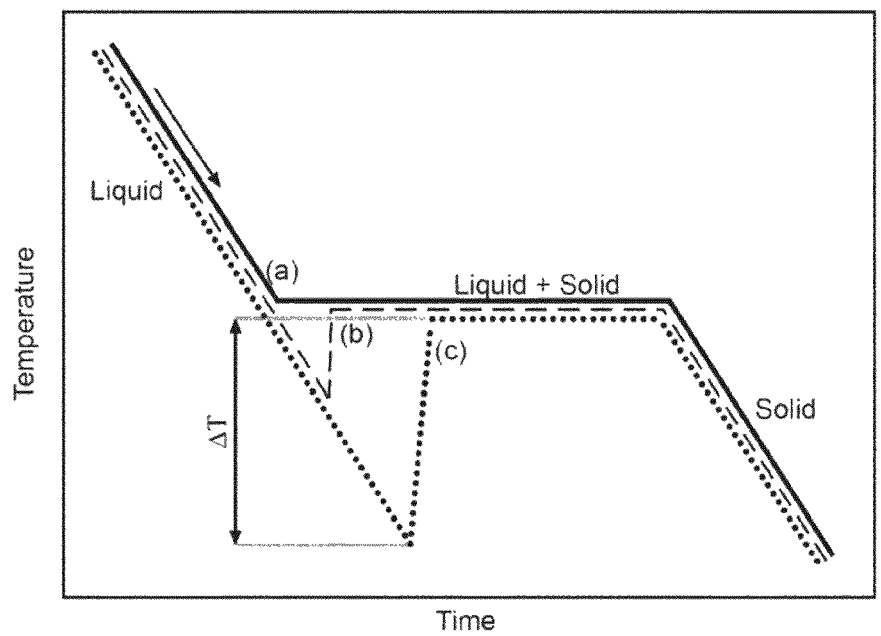
FIG. 2 illustrates a typical cooling history in a thermal energy storage medium a) in the absence of undercooling, b) in the presence of nucleation agents (small undercooling), and c) in the absence of nucleation agents (large undercooling).

The invention is the discovery of a new class of highly active nucleating agents for lithium nitrate trihydrate, and the use of mixtures of these two substances as a composite TES media. The composite TES media has a very large specific heat of fusion (287 J/g; 452 $MJ/m^3$ 409 $MJ/m^3$), which is even larger than that of water on a volumetric basis (FIG. 1). The specific nucleation agent described here is a copper hydroxy nitrate hydrate $[Cu_3(OH)_5(NO_3).2H_2O]$ having a crystal structure of the mineral Likasite. See, e.g., Effenberger, H., Neues Jahrb. Mineral. Monatsh., 1986, 101-110 incorporated herein by reference. This additive dramatically suppresses undercooling and leads to predictable crystallization temperatures. Furthermore, the effect of this nucleation agent does not degrade substantially over large numbers of melting and freezing cycles or over long periods of time at elevated temperature (T>$T_m$ the melting temperature).

The copper hydroxy nitrate hydrate nucleation agent promotes nucleation by having lattice parameters that are to the nucleate and by having an ionic, hydrophilic surface. Both Likasite and lithium nitrate trihydrate adopt quasi-layered crystal structures, and the in-plane lattice parameters of the two phases differ by less than 3% along one axis, and less than 0.5% along the other (Hermansson, K. et al., Acta Cryst., 1984, C40, 335-340.; Effenberger, H., Neues Jahrb. Mineral., Monatsh., 1986, 101-110.). Furthermore, it is worth noting that both structures present nitrate groups perpendicular to these layers, oriented nearly identically. Thus, the surface energy of the lithium nitrate trihydrate/Likasite interface is likely small. This combination creates favorable nucleation sites which, in turn, significantly decreases the undercooling of the combined heat storage material, it is worth noting that other candidate phases that were identified with similar lattice mismatch to lithium nitrate trihydrate, but chemically dissimilar surfaces (e.g. $FeSb_2$, $ZrSiO_4$) were significantly less effective as nucleation agents.

Figure 4:
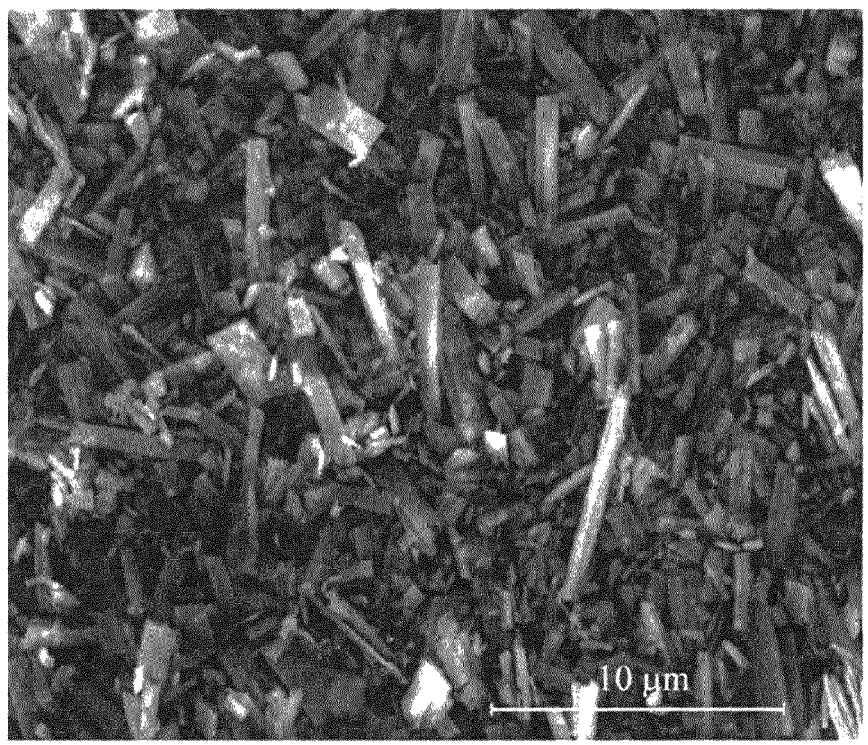
FIG. 4 illustrates the typical microstructure of copper hydroxy nitrate hydrate (Likasite) grown by the precipitation mechanism described herein.

The nucleation agent described here, copper hydroxy nitrate hydrate (Likasite), may be synthesized directly from solution. See, e.g., Yoder, C. H. et al., Mineralogical Magazine, 2010, 74, 433-440, incorporated herein by reference. Following this approach, equal concentrations of copper acetate and sodium nitrate are dissolved in deionized water and are precipitated by the slow addition of excess sodium hydroxide, which results in fine belts (about 10 μm length, about 1 μm width, about 0.1 μm thickness, FIG. 4). The resulting precipitate (Likasite) is dried, crushed, and dispersed throughout the lithium nitrate trihydrate. Sufficient quantities of the nucleation agent are added to the system to suppress undercooling to less than about 8° C. in very small sample volumes, averaged over a large number of cycles. Laboratory experiments, illustrated in FIG. 5, have demonstrated that this is possible with very small concentrations of nucleation agent (less than 0.1 wt %) over a wide range of cooling rates (1° C./min-20° C./min. However, typical concentrations may range from about 0.1 wt % to about 10 wt % (but are preferably less than about 1 wt %).

Figure 6:
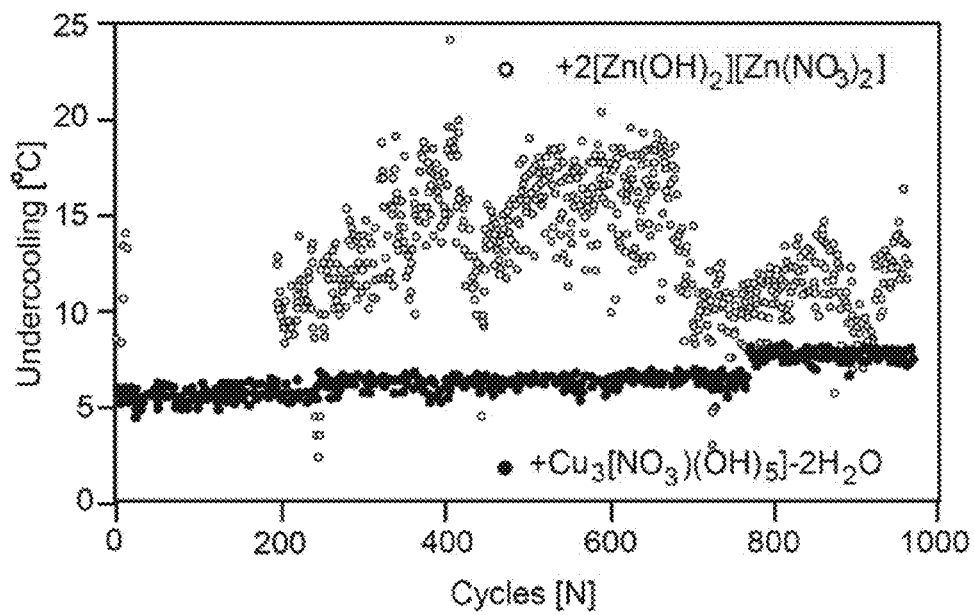
FIG. 6 illustrates undercooling in lithium nitrate trihydrate with the addition of nucleation agents zinc hydroxy nitrate and copper hydroxy nitrate hydrate as a function of number of melting and freezing cycles.
Figure 7:
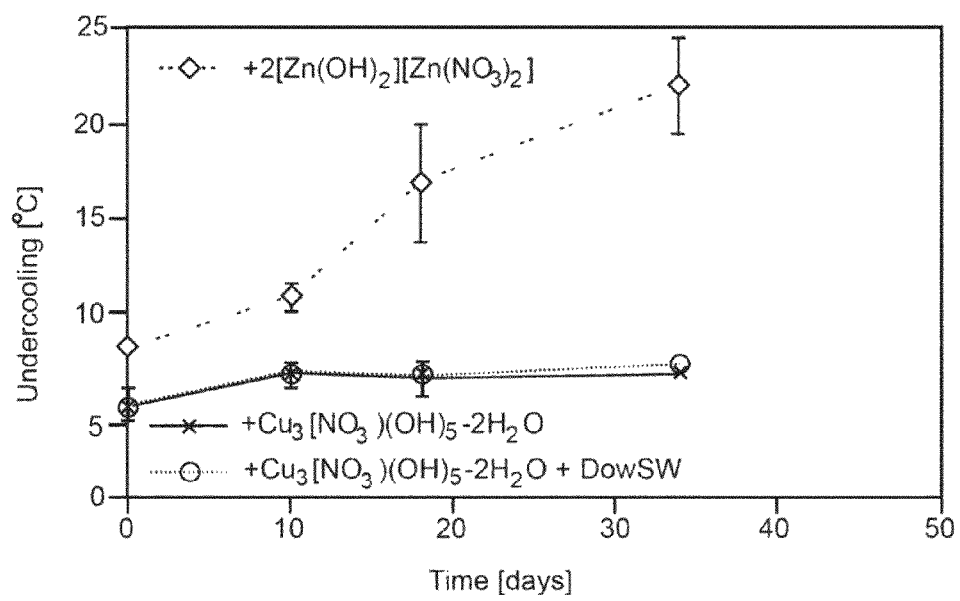
FIG. 7 illustrates undercooling in lithium nitrate trihydrate with the addition of nucleation agents zinc hydroxy nitrate and copper hydroxy nitrate hydrate as a function of time held at 50° C. ($T>T_m$).

For practical applications, a composite TES media needs to be stable over both large numbers of cycles and long periods of time (potentially at elevated temperatures). Dissolution or corrosion of nucleation agents, or other surface reactions between the nucleation agent and the surrounding medium, all have the potential to degrade the activity of the nucleation agent over time. In the proposed system, experiments have demonstrated that the lithium nitrate trihydrate/Likasite composite TES media is stable both over large numbers of melting and freezing cycles (FIG. 6) and long periods of time at elevated temperature (T>$T_m$, the melting temperature, FIG. 7).

The described TES media may be used in high thermal conductivity composites to more rapidly absorb heat. Such composites may include the use of high thermal conductivity fibers or foams (e.g., graphite, copper), as well as surfactants, to improve the wetting of such composites. Nonionic silicone surfactants do not affect the activity of the nucleation agents described here or the undercooling behavior of the composite TES media.

The composite TES media may be appropriate for a variety of heat storage unit or module designs, including, encapsulated beads, thickened gels or suspensions, infiltrated foams or porous materials, or compartmentalized pouches or cells. In these configurations, the nucleation agent could be suspended within the TES medium, could be loose within the module, or could be bound to solid surfaces in the module.

Lithium nitrate trihydrate tends to absorb moisture from the air, which changes its composition and, therefore, its freezing and melting characteristics. Therefore, it is necessary to hermetically seal the TES medium within the module design to avoid moisture gain (or loss). One effective approach demonstrated here is to hermetically seal a small volume of the TES medium in an aluminum container (e.g., by crimping a lid onto a base). This approach may be scaled to larger components in which the hermetic seal is an airtight weld. Other encapsulation approaches (e.g., polymer coatings), which prohibit diffusion of water, are also feasible.

The following examples are intended to illustrate the present invention and should not be construed in limitation thereof.

EXAMPLES

Figure 3:
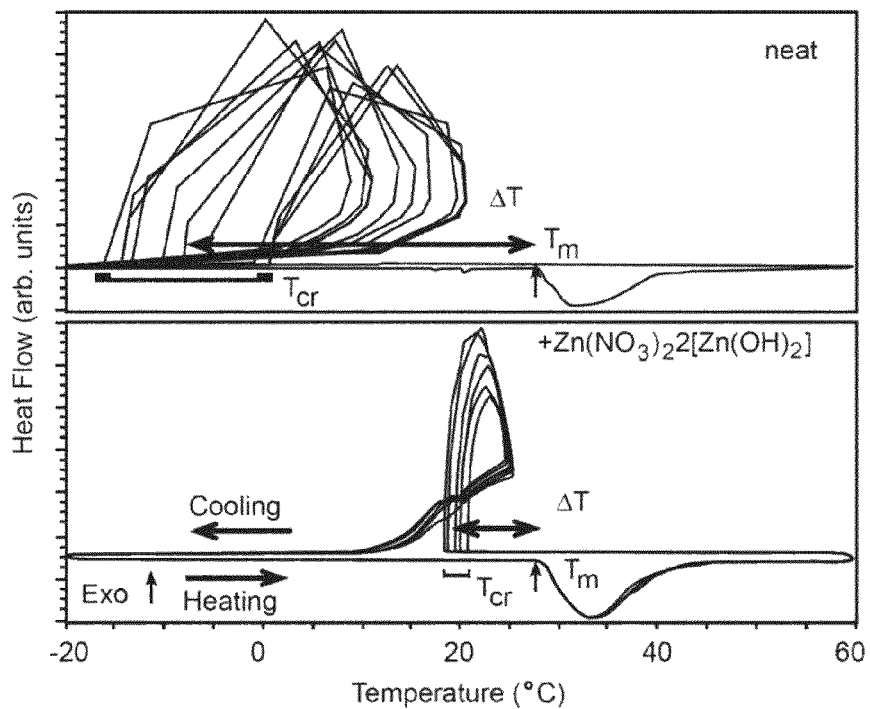
FIG. 3 illustrates undercooling of lithium nitrate trihydrate: 1) in the absence of nucleation agents and 2) with about 1 wt % zinc hydroxy nitrate [$Zn_3(NO_3)2(OH)_4$]. Undercooling is specifically indicated on the figure ($\Delta T$), and is defined as the temperature difference between the melting temperature ($T_m$) and the crystallization temperature ($T_{cr}$).

The examples were conducted as follows:

Approximately 10 μL of lithium nitrate trihydrate was hermetically sealed in aluminum pans both with and without nucleation agents. These pans were heated and cooled at continuous rates of 10° C./min from −20° C. to 60° C. in a differential scanning calorimeter (DSC). Average undercooling (ΔT), as well as 2σ standard deviations of crystallization temperatures were collected over a number of cycles and are shown in FIG. 3 and Table 1.

TABLE 1

| Nucleating Agent | wt % | Avg. ΔT [° C.] | 2σ [° C.] | # cycles |
|---|---|---|---|---|
| 1) Pure $LiNO_3$—$3H_2O$ | — | 38.8 | 14.3 | 19 |
| 2) $Zu_3(NO_3)_2(OH)_4$ | 0.9 | 13.3 | 5.0 | 7 |
| 3) $Cu_3(NO_3)(OH)_5$—$2(H_2O)$ | 0.8 | 5.8 | 0.2 | 5 |

Figure 5:
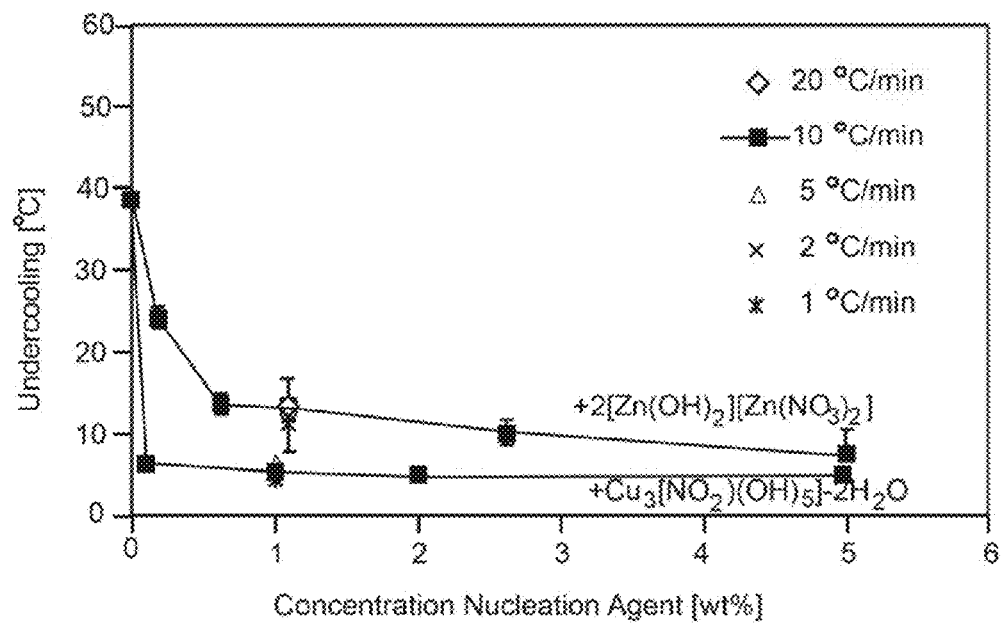
FIG. 5 illustrates undercooling in lithium nitrate trihydrate with the addition of nucleation agents zinc hydroxy nitrate and copper hydroxy nitrate hydrate as a function of nucleation agent concentration and cooling rate.

Following the conditions described above, pure lithium nitrate hydrate approaches average undercoolings of about 40° C. (and in some cases greatly exceeds this amount). Furthermore, great variation exists from run-to-run on the crystallization temperature of the heat storage material. Lithium nitrate trihydrate containing about 1 wt % of a previously described nucleation agent [$Zn_3(NO_3)_2(OH)_4$) decreases the undercooling observed (Hoover, M. J. et al., NASA Technical Report 19720007297, NASA-CR-150724, 1972). However, undercooling still exceeds 10° C., and substantial variation still exists from run-to-run. Lithium nitrate trihydrate containing about 1 wt % of the nucleation agent described here [$Cu_3(NO_3)(OH)_5.2(H_2O)$] decreases the undercooling to below a temperature ranging from 5° C. to 8° C., and decreases the 2σ variation to less than 1° C. (FIG. 5). Thus, this invention provides significant advantages over previous TES materials based on lithium nitrate trihydrate while maintaining its preferable energy density characteristics.

Additional experiments were completed to analyze the long-term stability of a composite lithium nitrate trihydrate/nucleation agent TES medium. Both copper hydroxy nitrate hydrate and zinc hydroxy nitrate nucleation agents were tested. For both, materials, hermetically sealed aluminum pans containing the TES medium were exposed to large numbers of cycles (N=1000, FIG. 6) or to elevated temperatures above the melting temperature (T=50° C., FIG. 7). It is apparent that the activity of zinc hydroxy nitrate rapidly degrades while copper hydroxy nitrate hydrate remains consistently active. In the latter case, undercooling increased slightly initially (to ΔT about 8° C.), but then remains steady, and never exceeds 10° C. Thus, the proposed composite lithium nitrate trihydrate/copper hydroxy nitrate hydrate has proven to be relatively stable.

What is claimed is:

1. A heat storage material comprising:
   lithium nitrate trihydrate; and
   a copper hydroxy nitrate hydrate nucleation agent.
2. The heat storage material of claim 1, wherein a concentration of the copper hydroxy nitrate hydrate nucleation agent ranges from about 0.1 weight percent to about 10 weight percent, relative to a total weight of the heat storage material.
3. The heat storage material of claim 1, further comprising:
   thermal conductivity fibers or a thermal conductivity foam.
4. The heat storage material of claim 1, further comprising:
   a surfactant.
5. The heat storage material of claim 4, wherein the surfactant is a nonionic silicone surfactant.

* * * * *